United States Patent Office 3,371,841
Patented Mar. 5, 1968

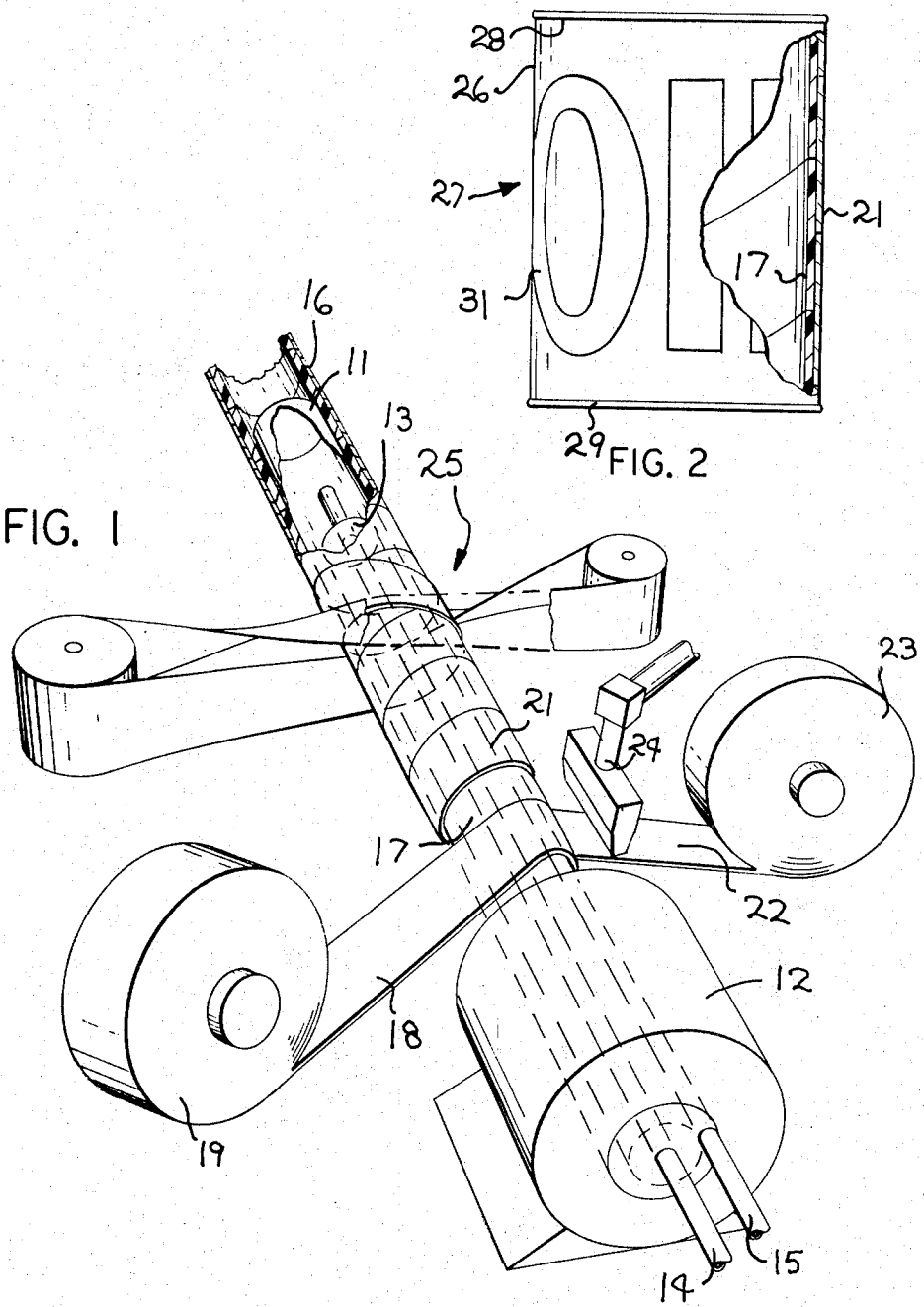

3,371,841
CYLINDRICAL ARTICLE
James C. O'Neal, Jr., Toledo, Ohio, assignor to Owens-Illinois, Inc., a corporation of Ohio
Filed Jan. 3, 1967, Ser. No. 606,929
3 Claims. (Cl. 229—4.5)

ABSTRACT OF THE DISCLOSURE

This application discloses the construction of a cylindrical article having utility in the manufacture of can-type containers and comprising inner and outer plies of thermoplastic material bonded to one another by a suitable adhesive. The inner and outer plies of the article are formed from spirally-wound strands of thermoplastic material. The application also discloses a spiral-winding method for forming such a cylindrical article in which a cooling medium is circulated through the winding mandrel to reduce frictional forces between the article being formed and the winding mandrel.

Brief summary of the invention

Various thermoplastic materials, such as polyethylene and polypropylene, have gained favor in recent years as construction materials for use in the manufacture of cylindrical bodies for can-type containers for various packaging applications. Because of the well-known chemical, physical and economic attributes of these thermoplastic materials, containers formed therefrom are superior in a number of respects to containers formed from other materials such as aluminum, tin-plated steel, paper and composites, especially of paper. However, prior to the present invention, thermoplastic can-type container bodies formed by known techniques, such as thermoforming or blowing, were inferior to container bodies formed from other materials with respect to the quality of the printing and decoration which could be provided on the outer surface of the container body. Containers formed from other materials have long been compatible with high-quality decorating techniques, such as rotogravure printing, and the packagers of a wide variety of products have found it desirable, from a merchandizing standpoint, to use high-quality decorating and labeling techniques.

In accordance with the present invention, there is provided an all-plastic can-type container body comprising inner and outer body plies bonded to one another by a suitable adhesive, each of the body plies being formed from a spirally-wound strand of thermoplastic material, generally in the manner in which containers having one or more structural body plies of paperboard of fibreboard are conventionally formed. In such a construction, the outer ply is formed from a strand of thermoplastic material which is of a light-gauge thickness (e.g. 5–10 mil thickness in the case of medium density polyethylene) and many techniques are available for imparting high-quality printing or decorating to plastic sheeting of such limited thickness. The inner ply of such article on the other hand, can be of a much greater thickness (e.g. 20–25 mil thickness in the case of medium density polyethylene) to give the finished container sufficient strength to withstand the loadings to which it will be subjected in service.

In the spiral winding of cylindrical articles of the type heretofore described, care must be taken to avoid significant heating of the inner plies to avoid the shrinking phenomenon which occurs when many plastic materials are heated. Such heating would tend to occur naturally in most spiral winding systems due to the sliding nature of the tightly-wound article on the winding mandrel. While it is contemplated that this problem can be avoided by means of a pneumatic winding mandrel of the type described in U.S. Patent 3,102,458, now owned by the assignee of this present application, it is proposed that the problem can also be solved by providing means to circulate a cooling medium through the mandrel, e.g. a refrigerant initially in a liquified state, to cool the winding mandrel to a sub-ambient temperature. In this manner, the heat generated by the frictional movement of the article being wound on the winding mandrel is quickly absorbed by the coolant and the plastic material is not heated to a temperature which would cause it to shrink.

Accordingly, it is an object of the present invention to provide a cylindrical article comprising spirally-wound plies of a thermoplastic material. It is a further object of the present invention to provide a spiral-winding process for manufacturing a spirally-wound plastic article. For a further understanding of the present invention, attention is directed to the detailed description of the invention, the drawing and the appended claims.

In the drawing

FIG. 1 is a schematic view, in perspective, of spiral-winding equipment useful in the practice of the method of the present invention and in the manufacture of articles of the present invention; and FIG. 2 is an elevational view of a can-type container of the present invention having a body formed from an article of the present invention, portions of the container being broken away to show construction details of other portions thereof.

Detailed description of the invention

In accordance with the present invention there is provided a cylindrical forming mandrel 11 of substantial length mounted in over-hanging fashion by means of a bearing block 12. For reasons which will subsequently be discussed, mandrel 11 is of hollow construction and is provided with suitable internal flow directing means 13 to provide a flow path therethrough for a cooling fluid introduced by way of conduit 14 and removed through conduit 15. In a preferred embodiment, a liquified refrigerant is introduced through conduit 14 and mandrel 11, in effect, serves as the evaporator in a circuit comprising other standard refrigeration components (not shown). The use of other cooling fluids, e.g. chilled water or brine, is also contemplated.

A tubular article 16 is formed on mandrel 11 from a pair of plies of thermoplastic material disposed in a radial sequence, each ply being formed by spirally winding a strip of thermoplastic material into a tubular configuration. In accordance with the present invention, the innermost ply 17 of tubular article 16 is formed by advancing a strand of thermoplastic material 18 from a supply roll 19 longitudinally of itself toward mandrel 11 and at a suitable lead angle, relative to the central axis of mandrel 11, to form ply 17 as its advance is continued around mandrel 11. Similarly, outermost ply 21 of article 16 is formed by advancing a second strand 22 of thermoplastic material from a second supply roll 23 toward mandrel 11 to be superimposed on article 17. In the finished article it is important that ply 21 be securely bonded to ply 17 and this bonding can be accomplished generally in the manner described in copending application Ser. No. 460,018, filed by Sheldon F. Roe, Jr., and assigned to the assignee of this application.

Pursuant to the Roe bonding system, there is provided an extruder, represented schematically by an extrusion head 24, for extruding a thermoplastic material across the surface of strand 22 which will contact the outer surface of ply 17 as strand 22 moves toward mandrel 11, the thermoplastic extrudate from extrusion head 24 being of a composition compatible with the composition of strands 18 and 22, being at an elevated temperature such that it has substantial adhesive properties, and being applied at a location of strand 22 to avoid substantial cooling before it comes in contact with ply 17. Alternatively, plies 17 and 21 may be bonded to one another in other ways, as by the application to one of strands 18 and 22 of other suitable adhesive materials (e.g. hot-melts), by treating one of the strands with a volatile solvent, or by ultrasonic welding.

It is to be noted that the continuous advancement of article 16 along mandrel 11, with consequent advancement of strands 18 and 22 from rolls 19 and 23 and with consequent continuous formation of plies 17 and 21 therefrom, can be effected by means of a conventional frictional belt drive system 25. Normally, associated with the spiral winding equipment for practicing the present invention will be additional means (not shown) for severing article 16 into sticks of a pre-determined length as article 16 passes from the mandrel. Such sticks may subsequently be cut into a number of can bodies of pre-determined length by separate recutter means (not shown).

As is shown in FIG. 2, a can body 26 formed from article 16 may thereafter be incorporated into a can-type cylindrical container 27 by the application to the ends thereof of first and second imperforate end closure elements 28 and 29. Closures 28 and 29 may be of metallic construction and may be attached to can body 26 by seaming. Alternatively, closures 28 and 29 may be of plastic construction and may be attached to can body 26 by spin welding.

In the practice of the present invention, strands 18 and 22 will be of a material compatible with the chemical and physical characteristics of the product to be packaged in container 27, e.g. medium density polyethylene for the packaging of motor oil and polypropylene for the packaging of food shortening. The surface of strand 18 which will be disposed on the outside of container 27 is provided with labeling and/or decorative indicia 31 in a repetitive pattern by any of the known processes for high-quality printing on plastic sheeting. Consequently, the thickness, or gauge, of strand 18 is determined by the characteristics of the printing equipment, but will generally be of the order of 5–10 mils. The thickness of strand 18 need not be limited by considerations relevant to the thickness of strand 22 and may easily be of the order of 20–25 mils which is adequate to form a can body of suitable strength for a wide variety of packaging applications.

In the winding process, it is preferred that ply 17 be formed with a butt seam, i.e., with the edges of successive convolutions thereof in abutting relationship. It will normally be desired to seal the spirally extending seams of the ply and it is contemplated that means (not shown) may be provided to insert material between ply 17 and mandrel 11 to bridge the portion of adjacent convolutions which bridges such seam. The use of a tape of thermoplastic material for this purpose in the manner described in co-pending application Ser. No. 564,069, filed by John Morrison and assigned to the assignee of this application, is contemplated. Ply 21, on the other hand, may be formed with a lapped seam since the limited thickness of strand 22 minimizes the thickness of the protruding bump which is characteristic of lapped seam spirally-wound containers.

It is also to be noted that strands 18 and 22 should be delivered to mandrel 11 at such locations that the spiral seams of plies 17 and 21 will be offset from one another, since the weak point of a spirally wound ply is at the seam.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

I claim:
1. A cylindrical, substantially all-plastic container body having a wall structure consisting essentially of: a single-thickness spirally-wound interior impervious ply of thermoplastic material of a gauge comprising the major portion of the thickness of the wall; a single-thickness spirally-wound exterior impervious light-gauge ply of thermoplastic material bonded to the interior ply; and rotogravure or equivalent high quality decorative material applied to the outer surface of the exterior ply.

2. A container comprising a container body according to claim 1; and first and second imperforate end closure members affixed in a closing manner to opposite ends of said body.

3. A container body according to claim 1 wherein the spirally extending seams of the interior and exterior plies are offset from one another.

References Cited
UNITED STATES PATENTS

| | | | |
|---|---|---|---|
| 3,144,975 | 8/1964 | Turnage et al. | 229—4.5 |
| 3,159,515 | 12/1964 | Dunlap et al. | 229—4.5 X |

DAVID M. BOCKENEK, *Primary Examiner.*